Sept. 19, 1967 K. KOCHER 3,343,094

CARRIER FREQUENCY GENERATORS

Filed July 28, 1964 2 Sheets-Sheet 2

United States Patent Office 3,343,094
Patented Sept. 19, 1967

3,343,094
CARRIER FREQUENCY GENERATORS

Klaus Kocher, Hofingen-Wurttemberg, Germany, assignor to International Standard Electric Corporation, New York, N.Y., a corporation of Delaware Filed July 28, 1964, Ser. No. 385,692
Claims priority, application Germany, Aug. 20, 1963, St 20,996
3 Claims. (Cl. 328—17)

Figure 1:
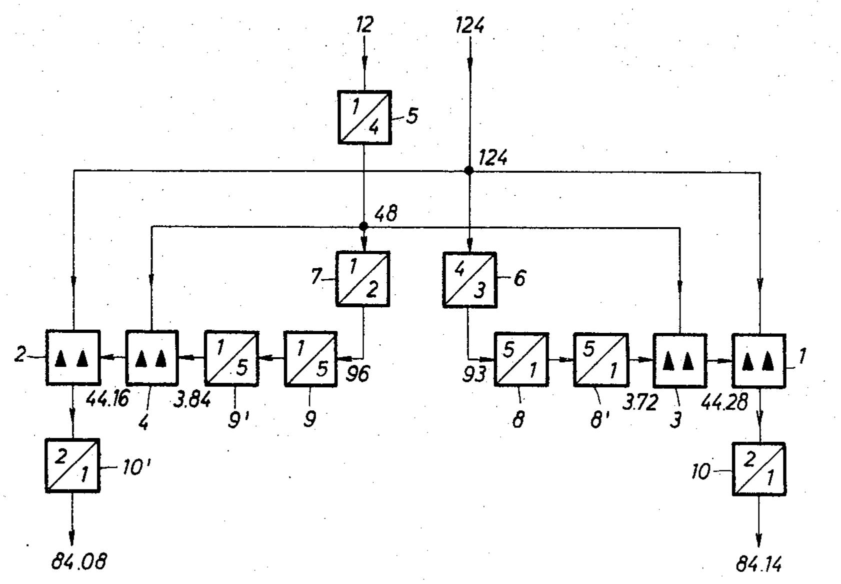

The invention refers to frequency generators and in particular to systems for generating the pilot frequencies 84.04 and 84.14 kc./s. out of those frequencies furnished by a carrier frequency supply unit in a multichannel carrier frequency system.

Modern carrier-frequency supply units furnish the frequencies 4, 12, 60, 124, 440 . . . kc./s. Units for generating 114 and 300 kc./s. do not belong to the standard equipment and are supplied only at option. The frequencies furnished by such c-f supply unit are derived from highly stabilized generators. If other frequencies are required in a c-f system such frequencies must either be generated by means of additional stabilized generators or derived from frequencies furnished by the c-f supply unit. Since the operation of additional stabilized generators is in most cases very expensive, a preferred method is to derive the desired frequencies 84.08 and 84.14 kc./s. either directly from the highly stabilized frequency of the c-f supply unit or indirectly from one or several frequencies obtained from said one frequency by multiplication or subdivision, respectively.

However, certain recommended standardized frequencies for the group pilot that is 84.08 and 84.14 kc./s. are not integral multiples or parts (subdivisions) of the frequencies furnished by a carrier supply unit. Also, they are not equal to the sum or the difference of two frequencies furnished by the c-f supply unit. Thus, the generation of the recommended group pilot frequencies is comparatively expensive.

The object of the invention is to generate the group pilot frequencies 84.08 and 84.14 kc./s. from the frequencies furnished by the c-f supply unit, viz 4, 12, 60, 124, 440 . . . kc./s. by means of equipment for multiplication, subdivision, and mixing, known per se.

It is a related object of this invention top rovide means for detecting the frequencies necessary to generate the desired pilot frequencies in such a way that the expenditure for components, such as multiplier and divider stages, modulators, filters, and amplifiers, is as low as possible. The use of a minimum of component parts increases the reliability. Reliability should in particular be considered in the case of central equipment for generating the group pilot frequencies. For the case of reliability it is also mandatory to avoid high multiplication and division factors and to maintain a minimum possible distance to adjacent harmonics or products of frequency mixing.

According to the invention such an optimum solution is achieved in that the frequencies 12 and 124 kc./s. are used as a base, that is the frequencies 84.08 and 84.14 kc./s. are obtained from the frequencies 12 and 124 kc./s. by the methods of multiplication, subdivision, and mixing, known per se, and that for multiplication and subdivision per stage only integral factors less than or equal to 5 are used.

In a further embodiment four variants for generating the group pilot frequencies 84.04 and 84.12 kc./s. are described in the following paragraphs.

The invention is now described in detail with the aid of the accompanying drawings wherein: the FIGURES 1 through 4 show four embodiments of the invention that differ from each other only in the position of the modulators or divider stages. The same references are used in the various figures for components which are similar in function.

In the circuit arrangement according to FIG. 1, the frequency of 124 kc./s. is applied to one input of a pair of first modulators 1, 2. A pair of divider stages 10, 10′ each with the dividing ratio 1:2 follows the output of the modulator stages 1, 2 respectively. The other input of the modulator 1 is impressed with the frequency 44.28 kc./s. so that at the output of the modulator 1 the frequency of 168.28 kc./s., viz, the sum frequency 124+44.28 kc./s. is obtained. The output of divider stage 10 is 84.14 kc./s. which is one-half of 168.20. The frequency of 44.28 kc./s. is obtained from the input frequency 124 kc./s. in that the frequency of 48 kc./s. is applied to one input of a second modulator 3 while the frequency 3.72 kc./s. is applied to the other input of modulator 3.

The said 48 kc./s. frequency signal is obtained by multiplying the input frequency of 12 kc./s. by 4 in a multiplier stage 5. When the frequency of 3.72 kc./s. is applied to the second input of the modulator 3, the output of the said modulator is the frequency of 44.28 kc./s. which is the difference frequency 48—3.72 kc./s.

To this end the required frequency of 3.72 kc./s. can be derived in a simple manner from the frequency 124 kc./s. with means of a re-conversion divider stage by division by the factor 4 and multiplication by the factor 3 the frequency of 93 kc./s. is obtained. From there the frequency 3.72 kc./s. results by a double division with the factor 5.

In order to derive the 84.08 kc./s. frequency from the output of the divider stage 10′ following the modulator 2, the other input of the modulator 2 is impressed with the frequency 44.16 kc./s. Thus, at the output of the modulator 2, the frequency of 168.16 kc./s. is obtained as the sum of frequencies 124 and 44.16 kc./s. The frequency 168.16 is divided by the factor 2 in divider 10′ to give the resultant frequency 84.08 kc./s.

The frequency 44.16 kc./s. is derived from the frequency 48 kc./s., obtained from the 12 kc./s. input frequency by multiplication in stage 5. The frequency of 48 kc./s. is applied to one input of a second modulator 4, whereas the other input receives the frequency 3.84 kc./s., resulting in a frequency of 44.16 kc./s. as difference frequency 48—3.84 kc./s.

The frequency 3.84 kc./s. is derived in an easy way from 48 kc./s. in doubler-stage 7 the frequency of 96 kc./s. is generated from which the frequency 3.84 kc./s. is obtained by a double division with the factor 5 in two divider stages 9 and 9′.

Figure 2:
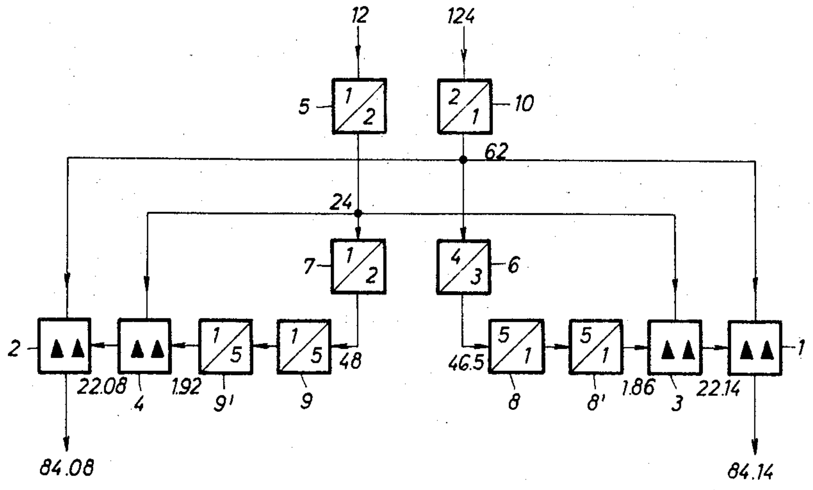

FIG. 2 shows a variant of the arrangement according to FIG. 1. Therein the frequency of 62 kc./s. is led to one input of the first modulators 1 and 2. The 62 kc./s. frequency is obtained by dividing the frequency 124 kc./s. into half in a divider stage 10. The dividers 10 and 10′ that follow the outputs of the modulators 1 and 2 in FIG. 1, can be omitted, when the multiplier stage 5 has the factor 2 instead of the factor 4. Due to said measures the kc./s. value of all frequencies at the inputs and outputs of the other stages are half the values required for the circuit arrangement according to FIG. 1. The individual values may be gathered from the drawing.

Figure 3:
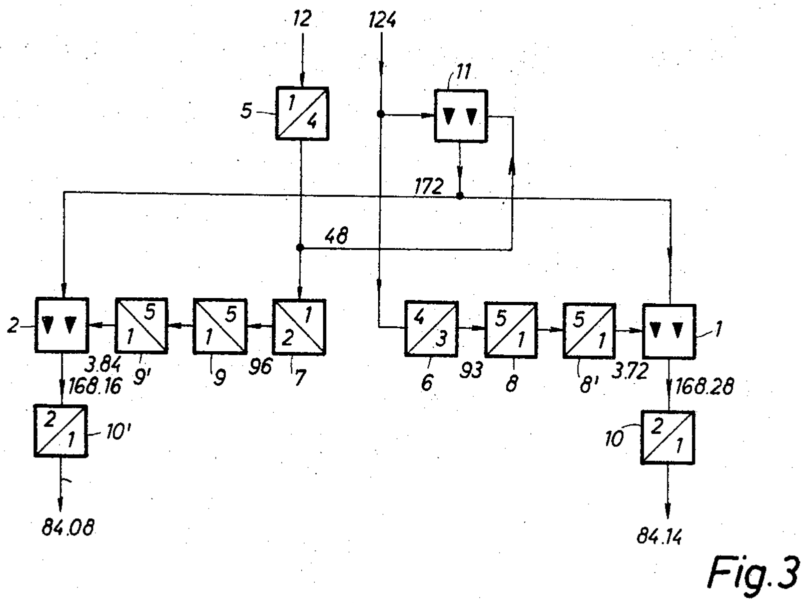
Figure 4:
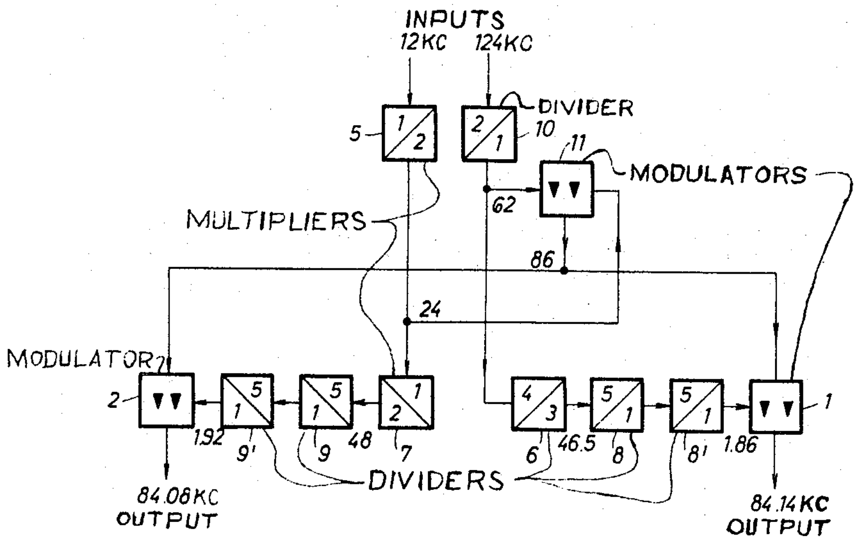

FIG. 3 represents another variant of the circuit arrangement shown in FIG. 1, while FIG. 4 shows a variant corresponding to the one in FIG. 2. In both circuit arrangements the second modulators 3 and 4 of FIGS. 1, 2 respectively can be omitted because the input of the modulators 1, 2 are not impressed with 124 and 62 kc./s. as they are in FIGS. 1, 2 respectively. They are impressed with 172 and 86 kc./s. in FIGS. 3 and 4 respectively. These frequencies are obtained in that the frequencies 48 kc./s. and 24 kc./s. are added to the frequencies 124 and 62 kc./s. in a modulator 11. In these circuit arrangements the derived frequencies appear at the output of the modulators 1 or 2 as the difference of the frequencies applied to the inputs of said modulators.

When in the four circuit arrangements a sufficient stability of the output amplitude is not yet obtained by suitable means in the individual components, the conventional arrangements known for the stabilization of amplitudes can be used, following said circuit arrangement according to the invention.

While the principles of the invention have been described above in connection with specific apparatus and applications, it is to be understood that this description is made only by way of example and not as a limitation on the scope of the invention.

I claim:

1. A carrier frequency generator system for supplying group pilot frequencies of 84.08 and 84.14 kc./s. obtained from basic frequencies of 12 and 124 kc./s. comprising a first and a second unit, said first unit having a two to one multipler, a pair of one-to-five dividers serially connected from the output of said two to one multiplier, first modulator means connected to the output of the second of said one to five dividers, said second unit having a three-to-four divider, a second pair of one-to-five dividers serially connected to the output of said three-to-four divider, second modulator means connected to the second of said second pair of one-to-five dividers, means including multiplier means for connecting said 12 kc./s. frequency to said first and second modulator means and to said two-to-one multiplier, means for coupling said 124 kc./s. frequency to said first and second modulator means and to said three-to-four divider and means coupled to the output of said first and second modulator means for delivering said 84.08 kc./s. signal from said first unit and said 84.14 kc./s. from said second unit.

2. The system of claim 1 wherein said means for coupling said 12 kc./s. frequency and said 124 kc./s. frequency to the first and second modulator means comprises third modulator means.

3. The system of claim 2 wherein said means for coupling said 124 kc./s. frequency to the three-to-four divider comprises divider means.

References Cited

UNITED STATES PATENTS

| | | | |
|---|---|---|---|
| 2,852,671 | 9/1958 | Cohn | 331—39 |
| 3,249,888 | 5/1966 | Hoffman | 331—39 |

ARTHUR GAUSS, *Primary Examiner.*

J. HEYMAN, *Assistant Examiner.*